Sept. 3, 1963  C. T. BREITENSTEIN  3,102,455
PISTON STRUCTURE
Original Filed Dec. 31, 1959
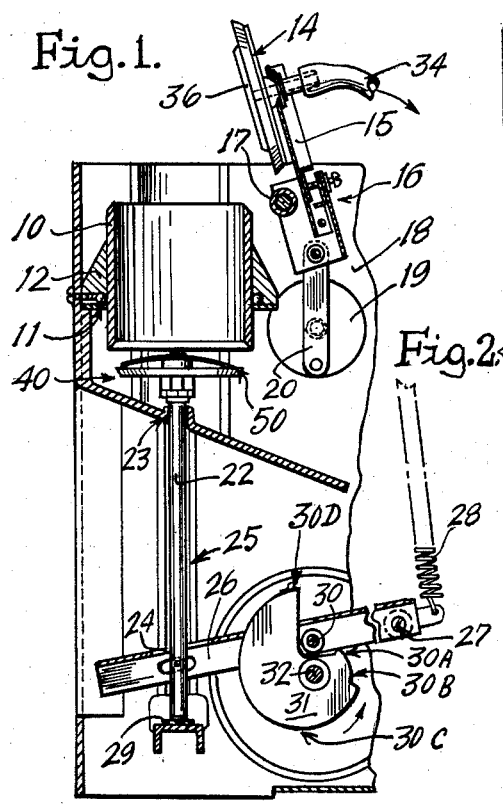
Fig.1.
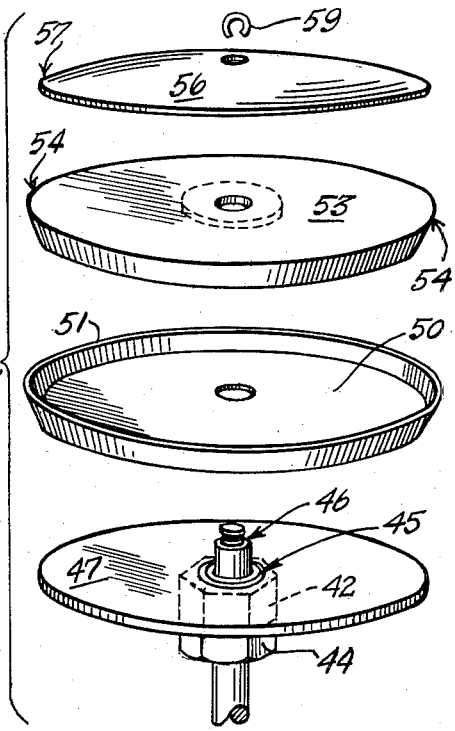
Fig.2.
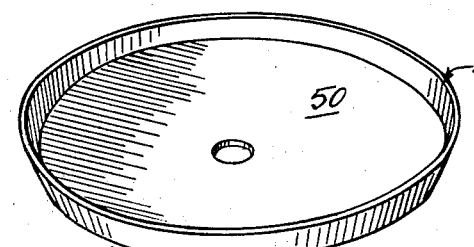
Fig.4.
POLYTETRAFLUOROETHYLENE RESIN
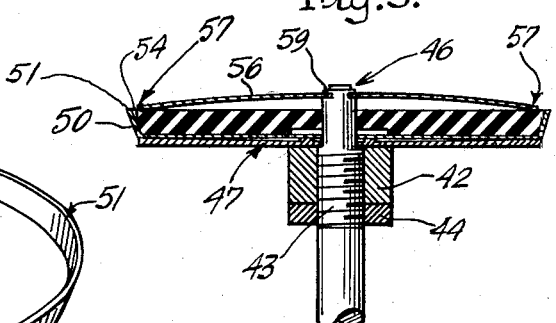
Fig.3.
INVENTOR.
CHARLES T. BREITENSTEIN
BY
ATTORNEY.

United States Patent Office 3,102,455
Patented Sept. 3, 1963

3,102,455
PISTON STRUCTURE
Charles T. Breitenstein, Chicago, Ill., assignor, by mesne assignments, to The Seeburg Corporation, Chicago, Ill., a corporation of Pennsylvania
Original application Dec. 31, 1959, Ser. No. 863,265. Divided and this application Sept. 14, 1960, Ser. No. 55,975
6 Claims. (Cl. 92—155)

This invention relates to improvements in piston structures particularly as applied to pistons used in beverage brewing apparatus such as the high-speed, one-cup coffee brewing machine disclosed in my copending application Serial No. 863,265, filed December 31, 1959, of which the present application is a division.

The novel piston structure as disclosed herein pertains especially to the provision of a simple sealing means carried on the head of the piston and affording an excellent fluid seal with the cylinder walls with minimized frictional loading in the excursions of the piston at both low and high speeds, with high resistance to break down in use over long periods in the presence of hot brew liquids, as well as freedom from growth of swelling tendencies, such as characterizes some other synthetics.

The attainment of the foregoing and other objects and advantages to appear may be effected by the construction described hereinafter in view of the annexed drawing, in which:

FIG. 1 is a partial vertical section through a coffee brewing unit employing the novel piston structure, parts being shown in elevation;

FIG. 2 is a fragmentary exploded perspective of the piston structure;

FIG. 3 is a sectionalized view of the piston parts of FIG. 2 in assembled relation;

FIG. 4 is a perspective view of the piston sealing cup.

In one adaptation of the piston structure to a high-speed one-cup coffee brewing device, according to FIG. 1, the piston works in a pre-heated brew cylinder 10 which is open at top and bottom and heated by a standby electric heating coil 11 carried in a channel in a mounting block 12 which retains the cylinder. A motor-driven top closure 14 is carried by bracket means 15 on a carrier lever 16 pivoted as at 17 on the chassis frame 18, and rocked by a motor-driven crank disc 19 through a link 20 acting in each predetermined brewing cycle to close and open the top of the cylinder at appropriate times.

The bottom opening of the brew cylinder is closed by a piston means 40 carried atop a piston rod 22 guided in a bore 23, formed in the chassis, at the upper end thereof, and also by means of a cross pin 24 traversing a lower portion of the rod and working with rollers (not seen) in guide channels 25 formed on opposite walls of the chassis.

Reciprocation of the piston is effected by oscillation of a long drive arm 26 pivoted as at 27 and urged downwardly by a heavy traction spring 28 so as to lodge the lower end of the piston on a resilient bumper stop 29 fixed therebeneath.

The upward movement of the drive arm is effected by coaction of a cam roller 30 thereon with a cam 31 on a motor-driven shaft 32 driven in a certain timed relation to the cover crank disc 19, as will appear.

The cam 30 is so evolved as to provide a short, fast rise at 30A, a short dwell at 30B, a long, fast rise along edge 30C, and a sudden drop-off at 30D.

The normal starting position of the piston means 40 is from a withdrawn position, as in FIG. 1, in which the bottom of the cylinder is open for scavenging and flushing purposes at the end of each brew cycle, the preferred actual clearance in practice being about 3/16-inch to minimize the travel of the closing stroke.

The intended operation of the brewing apparatus is such that at the beginning of each brew cycle the cam 30 starts to move while the cover stands open, and the piston rises very rapidly into the cylinder but only far enough to sealingly close the bottom therof, at which position it stops abruptly for the dwell while the cylinder is loaded by automatic means (not shown) with brew ingredients, which in the case of hot coffee will consist of hot water and charges of granulated coffee, following which the cover motor (not shown) will be energized to seat the lid 14 and close the top of the cylinder.

Simultaneously with homing of the lid, the piston resumes its upward travel for the duration of the long cam rise to the top of the cylinder, and thereby forces the hot extraction water through the coffee and out through a filtered pasage leading through the top closure or lid and thence into the flexible delivery line 34.

The inward driving or brewing stroke of the piston carries the head thereof just close enough to the top of the cylinder to leave some space beneath the filter 36 on the lid for the spent coffee grounds, at which position the piston suddenly drops the full distance of its return stroke, owing to passage of the cam roller 30 beyond the cam drop-off point at 30D, the action of the spring 28 returning the piston to starting position at a very rapid rate, to minimize the total time of the brewing cycle which, in commercial coin-controlled machines, is preferably about 11 seconds for the total brewing and discharge cycle. The piston is returned forcibly for two additional reasons: first, to set up a suction in the delivery line 34, and second, to gain momentum to produce a relatively violent scavenging impact when the piston is jarred to a stop.

Thus, the piston means 40 is required in such an application to be quickly thrust a short distance into the cylinder from a condition of complete withdrawal therefrom, and to work its way into the cylinder bottom to effect an immediate closing seal with a minimum of injurious impact and seating motion; and thereafter to afford a continuing seal in the pressure stroke in the presence of hot water at temperatures above 200° F. during the brewing advance, and thereafter to withstand a high-speed return travel in the presence of the granular residues while moving in contact with the electrically heated walls of the cylinder (average temperature about 230° F.).

Each brewing cycle terminates with the jarring impact of the piston rod against the bumper means 29, which serves to dislodge the spent coffee grounds from the piston head, there being also a final spurt of hot water ejected into the cylinder at this stage to wash-down the cylinder walls and piston head. The piston seal must also be maintained during the return stroke in order to create a back suction to forcibly pull back from the delivery line 34 an excess volume of the brew purposely retained therein to be sucked back into the cylinder by the high-speed return stroke of the piston to cleanse the filter 36 just before the cover is opened and the final jet of hot wash-down water is injected, as aforesaid.

A commercially reliable piston structure capable of performing under the conditions peculiar to the described brewing process consists of the simple components depicted in FIG. 2 and comprising the piston rod 22 having a seating means at the top thereof in the form of a nut 42 adjustably positionable on threading 43 and fixed in position by a lock nut 44, the upper end 45 of the rod being reduced and having a washer-seating groove 46 formed at the top thereof.

A metal seating disc or plate washer 47 having a central hole fitting upon a peened-over collar at 45 on the nut 42, as in FIG. 2, forms the base of the piston head, and has seated thereon a semi-rigid cup washer 50 having a narrow, upstanding skirt and salient rim portion 51 with a formed flare as shown, the height of which needs to be only about 1/15 the diameter of the bottom portion of the cup.

I have discovered that by making the sealing cup 50 of a synthetic fluorocarbon resin, such as tetrafluoroethylene, that excellent performance and durability is achieved. The cup can be die-formed from this material in sheet form, but I have found that superior results are obtained by sintering polytetrafluoroethylene in powder form.

For die-forming or pressing from this material in sheet form, the commercial product offered under the trademark "Teflon" by E. I. du Pont de Nemours & Co., Wilmington, Delaware, is satisfactory.

For sintering I prefer the material known under the trademark "Fluoroscint," which is a polytetrafluoroethylene modified by proprietary ingredients offered by The Polymer Corporation of Pennsylvania, Reading, Pennsylvania.

The ordinary Teflon die-pressed fluorocarbon sheet material tends to exhibit memory effects and spring back from initial form unless somewhat overformed, whereas the sintered polytetrafluoroethylene has no appreciable memory and the Fluoroscint brand of this material has in addition all of the advantages of Teflon to a superior degree, including very low coefficients of friction and thermal expansion, very low moisture absorption, and excellent wearing life under the brewing conditions above specified, and the cup 50 can be made of sintered polytetrafluoroethylene with a wall thickness of about 0.025 inch.

The piston structure is assembled by inserting into the cup 50, mounted on the base washer 47 as aforesaid, a relatively heavier and stiffer, but still resilient, filler washer 53 made preferably of rubber or a synthetic substitute such as silicone rubber, said filler washer having a beveled edge affording a sharp annular upper rim or salient peripheral lip 54 which will lie very close to, and substantially flush with, the upper salient rim portion 51 of the sealing cup, as in the assembly of FIG. 3, whereby the cup is likewise forced into its beveled flare so that the upper or leading margins 51 of the cup are maintained at the greater radial or diametric dimension to afford a snug sealing fit with the inner wall of the cylinder 10.

The piston structure is completed by application of a header disc 56 of thin springy metal slightly cupped and placed convex-side lowermost on the filler washer with the outer or peripheral margins 57 of the header washer bearing principally on the filler washer near the lip portion 54 thereof to further urge these parts against the juxtaposed walls of the sealing cup and maintain the greater diameter of the filler and cup assembly at these rim regions 51 and 54.

The header washer is kept under a moderate tension by means of a small retaining C-washer 59 sprung into the groove 46 in the rod, the groove being located relative to the seating nut, and the latter being adjustably threaded to such a position as to require springing the header washer somewhat against the filler washer in order to seat the retaining C-washer in the groove, as aforesaid. This tension aids in maintaining the peripheral flare of the Teflon cup at 51.

I claim:
1. A piston structure for use in a heated coffee brewing cylinder and comprising: a piston rod, an annular seating plate secured centrally near an end of said rod, a sealing member in the shape of a shallow cup made of a thin fluorocarbon synthetic resin having a flared narrow skirt with an outer rim portion disposed at a predetermined greater diameter than the remaining portions thereof, said member having a central opening fitting over said end of the rod to seat on said plate; an annular filler member of flexible material such as rubber dimensioned to fit within said cup over said end of the rod, and having a beveled edge flaring outwardly in juxtaposition against said rim portion of the cup to dispose the latter yieldingly at said greater diameter, and a concave header washer fitted upon said rod end, concave side down, onto said filler member with outer peripheral margins bearing down upon the beveled edge of the filler member close to the margin thereof and said juxtaposed cup rim, so that all three of said peripheral margins are in close juxtaposition, together with retaining means securing the header washer on the rod against the filler member under tension to yieldingly maintain the aforesaid flare and greater diameter of the cup rim.

2. A piston structure according to claim 1 further characterized in that said sealing member is formed from polytetrafluoroethylene in sheet material die-pressed with the flared cup shape specified.

3. A piston structure according to claim 1 in which said sealing member is formed from powdered polytetrafluoroethylene sintered into the cup shape specified.

4. A piston structure according to claim 1 in which said sealing member is formed from a powdered polytetrafluoroethylene sintered in the cup shape specified and having a wall thickness of about 0.025 inch.

5. A piston structure comprising a piston rod having a threaded end portion, a nut threadable onto said end portion and having fixed thereon an annular sealing plate, a lock nut for securing said first nut in positions of adjustment on said rod; a synthetic fluorocarbon resin sealing cup fitted centrally over said end portion onto said plate and having a narrow, outwardly flared skirt with a salient marginal rim disposed outwardly of the periphery of said seating plate for sealing engagement with a cylinder wall along a narrow peripheral margin thereof; a thick, springy filler washer of rubber-like material fitting substantially within said cup and having a beveled edge with a periphery of greater diameter juxtaposed to, and bearing against, said cup rim to yieldingly flare the latter outwardly; and a circular presser member secured on the rod with a raised central portion overlying said washer and only circumferential marginal portions bearing against the beveled edge region of the filler washer to maintain the latter under compression sufficient to yieldingly maintaining said cup rim with said peripheral edge of largest diameter thereof in a predetermined outwardly salient sealing condition for the purposes aforesaid.

6. A piston comprising a rod, an annular seat plate carried at an end of said rod, a cup-shaped seal seated on said plate and having an annular bottom wall which fits down in substantial peripheral registry upon said seat plate, said bottom wall having a shallow side wall skirt upstanding therefrom with an upper sealing rim flaring radially outwardly beyond the peripheral limits of said bottom wall and plate and remaining portion of the skirt wall and seal to provide a salient peripheral cylinder-engaging margin; and a resilient annular filler secured within the cup of the seal and having a side wall which is flared substantially in identical manner to said skirt wall to fit substantially flush against the inside surface of the latter, said filler having an upper peripheral salient edge portion which flares radially beyond said peripheral limits close against said skirt wall sealing rim to flare and back the salient margin of the latter for sliding and sealing action against a cylinder wall as aforesaid; and means including a downwardly concave spring presser secured to said rod on top of said filler and under tension with reversely salient peripheral edge portions thereof bearing down upon portions of said filler closely adjacent the said salient peripheral portions thereof juxtaposed with said seal rim near the salient margin of the latter and acting to flare said filler portions and thereby maintain said seal rim portion radially saliently outward for contact with a cylinder wall as aforesaid.

References Cited in the file of this patent
UNITED STATES PATENTS

| | | |
|---|---|---|
| 994,558 | Aspinwall | June 6, 1911 |
| 1,715,212 | Riggs | May 28, 1929 |
| 2,062,808 | Davis | Dec. 1, 1936 |
| 2,058,674 | Flinchum | Oct. 27, 1936 |
| 2,814,540 | Southerwick | Nov. 26, 1957 |
| 2,836,474 | Mosher | May 27, 1958 |